United States Patent
Masetta

[15] 3,706,488
[45] Dec. 19, 1972

[54] VARIABLE FILM REEL
[72] Inventor: Joseph P. Masetta, Rochester, N.Y.
[73] Assignee: Xerox Corporation, Rochester, N.Y.
[22] Filed: May 27, 1970
[21] Appl. No.: 40,833

[52] U.S. Cl. ................................353/26, 242/71.9
[51] Int. Cl. ........................G03b 23/00, B65h 75/18
[58] Field of Search....242/71.9, 73, 118.5, 179, 201, 242/205, 67.3, 67.4, 200; 352/129; 353/26

[56] References Cited

UNITED STATES PATENTS

| | | | |
|---|---|---|---|
| R22,517 | 7/1944 | Hopkins | 353/26 X |
| 2,280,750 | 4/1942 | Emerson | 353/26 |
| 3,523,657 | 8/1970 | Hearon | 242/200 |
| 2,710,727 | 6/1955 | Orowick | 242/71.9 X |
| 2,297,222 | 9/1942 | Kemma | 352/129 X |
| 2,406,434 | 8/1946 | Payne | 242/118.5 |
| 1,518,402 | 12/1924 | Feigelman | 242/71.9 |
| 3,354,776 | 11/1967 | Smitzer | 242/200 X |
| 3,025,016 | 3/1962 | DeBoo | 242/71.9 |

Primary Examiner—George F. Mautz
Assistant Examiner—Edward J. McCarthy
Attorney—James J. Ralabate, Benjamin B. Sklar and John E. Beck

[57] ABSTRACT

A film reel structure and support therefor characterized by the support being movable relative to a projection system with which it is associated. The reel structure is characterized by the capability of accommodating films having different widths through simple adjustment of the reel sections each having a rim or flange movable toward or away from the other rim or flange. The adjustment can be accomplished very easily and quickly without the use of tools.

14 Claims, 7 Drawing Figures

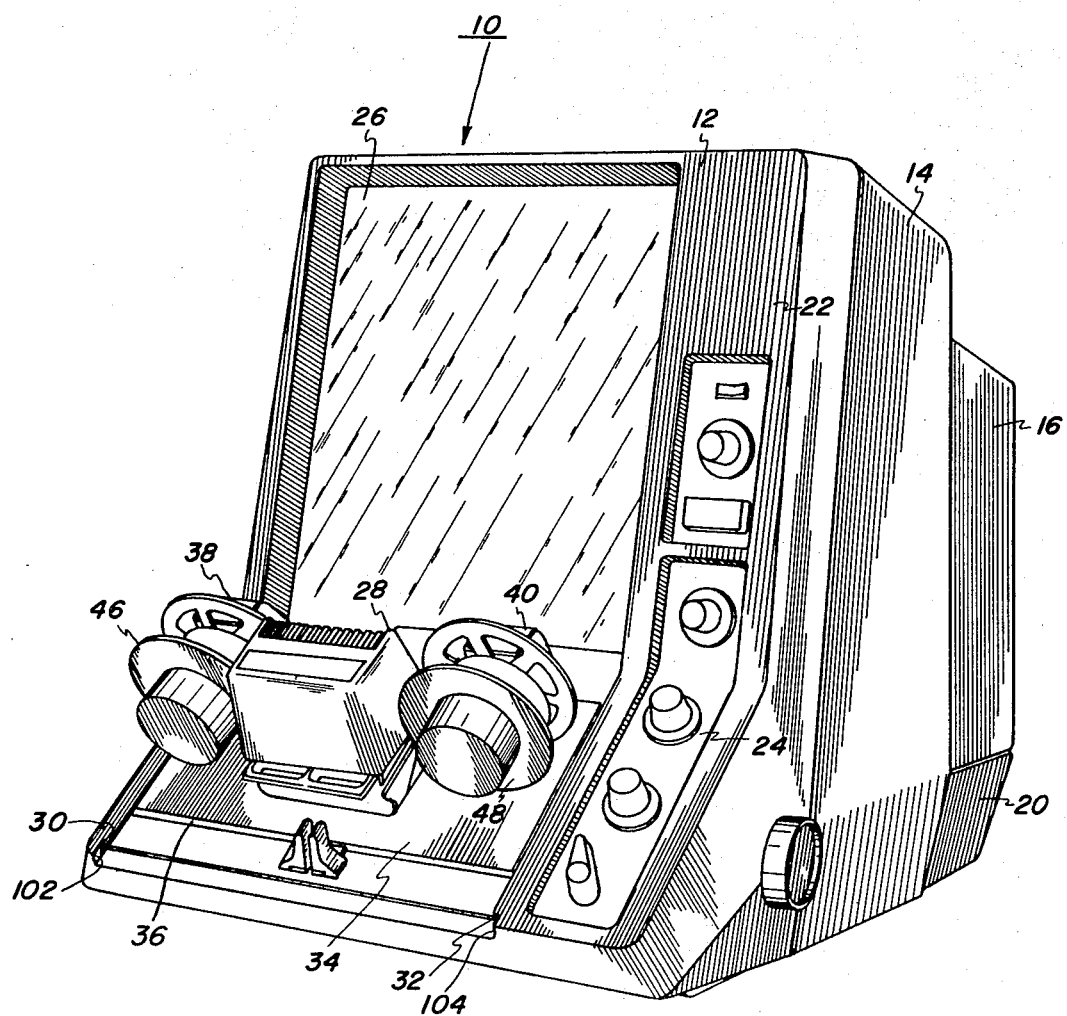
FIG. I

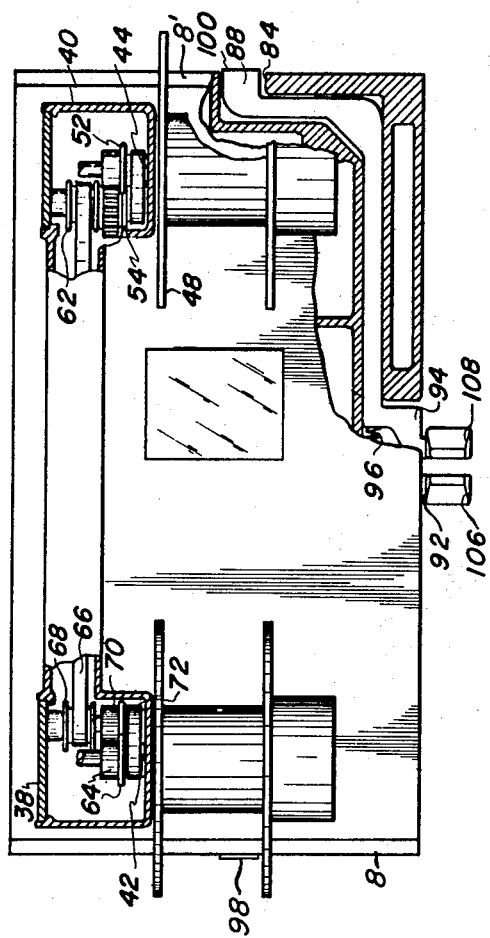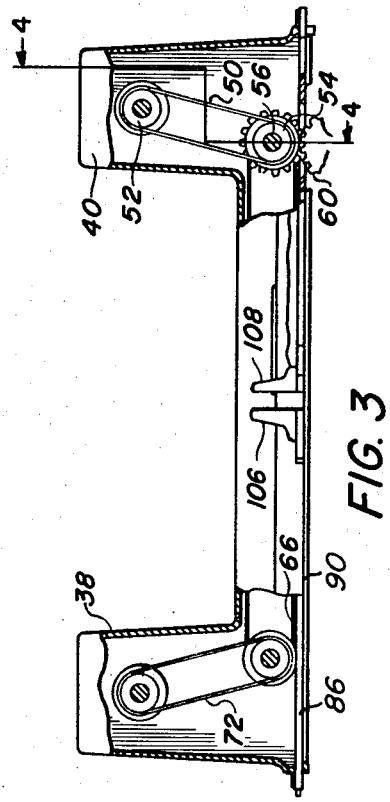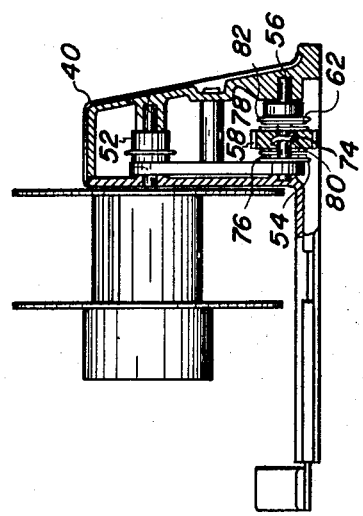

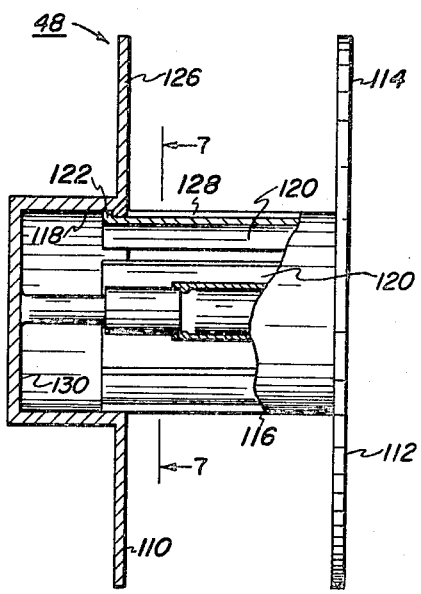
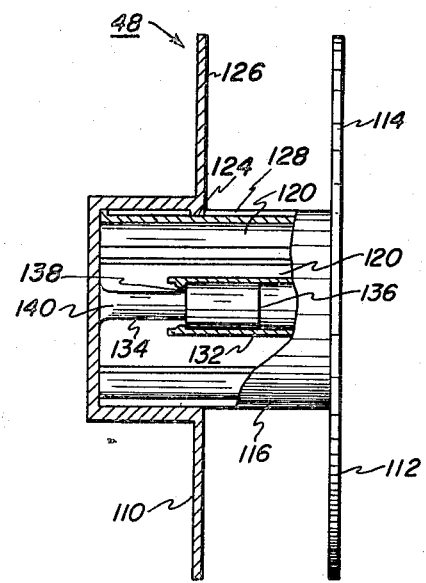
FIG. 5  FIG. 6
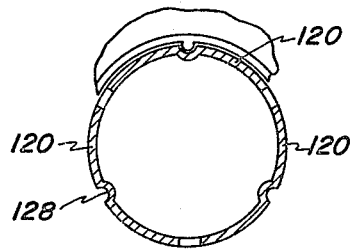
FIG. 7

VARIABLE FILM REEL

BACKGROUND OF THE INVENTION

This invention relates, in general, to microfilm viewing and copying apparatus and, more particularly, to mechanism for supporting microfilm for movement past a projection station.

Information of various kinds is stored on microfilm spools or reels which are kept in a location convenient to the machine with which they are used. Quite often the information is stored on different size films, for example, 16mm. and 35mm.

It will be appreciated that where there are different size films, a number of take-up reels of different sizes will be required. While the provision of a plurality of take-up reels is feasible, it is not desirable. This is because past experience indicates that loose reels get misplaced or lost.

The foregoing problem has been solved to a somewhat satisfactory degree by the provision of a single reel which accommodates a plurality of film widths. It is believed that known constructions of the foregoing type can be improved upon from a standpoint of cost and ease of operation.

Accordingly, the general object of this invention is to provide a new and improved film reel structure.

It is a more particular object of this invention to provide, in a film viewing apparatus, new and improved film support structure.

Another object of this invention is to provide a new and improved film reel structure which accommodates various width films.

BRIEF SUMMARY OF THE INVENTION

Briefly, the above-cited objects are accomplished by the provision of a film transporting mechanism supportable on a film viewing and copying apparatus such that it is movable relative to the image projecting system thereof.

The film transporting or transport mechanism is provided with a permanently attached take-up reel comprising a pair of reel sections which fit together in a telescoping relationship. To this end, the hub portion of one of the reel sections extends, when the reel sections are assembled, into a recess provided in the other reel section. A plurality of stop arrangements serve to lock the reel sections such that the reel structure can accommodate various film widths and also so as to prevent relative rotation between the reel sections.

Further objects and advantages of the present invention will become apparent from the drawings in detailed description thereof which form a part hereof.

DESCRIPTION OF THE DRAWINGS

FIG. 1 is a perspective view of a combination meter-printer apparatus incorporating the invention;

FIG. 2 is a top plan view, partly broken away, of a film transport module forming a part of the invention;

FIG. 3 is a front elevational view, partly broken away, of the film transport module illustrated in FIG. 2;

FIG. 4 is a cross-sectional view taken on the line 4—4 in FIG. 3;

FIG. 5 is a cross-sectional view, in elevation, of a film reel structure forming a part of the invention;

FIG. 6 is a cross-sectional view of the reel structure illustrated in FIG. 5, but in a different operative position therefrom, and;

FIG. 7 is a cross-sectional view taken along the line 7—7 of FIG. 5.

DETAILED DESCRIPTION OF THE PREFERRED EMBODIMENT

Referring to the drawings, especially FIG. 1, reference character 10 designates generally a film viewing and printing apparatus comprising front, middle and access cover sections 12, 14 and 16. A base member 20 supports the access cover 16 and extends forwardly beneath the middle section 14. The front section 12 comprises adjacent sloping wall structures 22 and 24 the former of which is provided with a viewing screen 26 and the latter of which pivotally supports a lamp housing 28, past which, film is moved in order to project information carried thereby to the screen 26 in a manner to be described hereinafter. The wall structure 24 has a pair of opposed grooves 30 and 32 for removably receiving a film transport module 34, see FIGS. 2, 3, and 4.

The module 34 comprises a base 36 having integral therewith a pair of spindle housings 38 and 40. The housings 38 and 40 respectively, support a supply spindle 42 and a take-up spindle 44 which, in turn, respectively support a supply reel 46 and a take-up reel 48, the latter of which is preferably permanently secured to its associated spindle by any suitable means, for example, by use of a suitable bonding agent. The spindles serve to spool film past the lamp housing 28 in both directions, consequently, the foregoing designations are used solely for reference purposes. The film which is manually attached to the take-up reel is removed from the supply reel through movement of the take-up spindle in a counterclockwise direction as viewed in FIG. 3. This is accomplished by means of a vertically oriented endless belt 50 drivingly connecting a spindle pulley 52 to an idler pulley 54, the latter of which is rotatably supported by a shaft 56 suitably journalled in the spindle housing 40 (See FIG. 4). Rotation of the shaft 56 is provided through a clutch member in the form of a gear 58 secured thereto and drivingly engaged by a gear 60 representing the output of a differential drive mechanism, not shown.

Rewinding of film onto the supply reel 46 is accomplished through clockwise rotation, as viewed in FIG. 3, of the gear 58 which causes rotation in the same direction as a pulley 62 carried by the shaft 56. The pulley 62 is drivingly connected to a spindle pulley 64 via a transversely extending and horizontally disposed endless belt 66, idler pulleys 68 and 70 and a vertically oriented belt 72.

The gear 58 is shiftable along the longitudinal axis of the shaft 56, shifting being accomplished through cooperation of the helix 74 carried by the shaft 56 and a recess in the form of a helix provided internally of the gear 58. The direction of rotation of the gear determines the direction of shifting. To provide alternate frictional drive, between the gear 58 and pulleys 54 and 62, the faces of the gear 58 are provided with friction pads 76 and 78 and adjacent faces of the pulleys 54 and 62 are provided with friction pads 80 and 82 (FIG. 4). The friction pads which may be made of any suitable material, for example, cork, are suitably secured to the aforementioned faces. Clockwise rotation of the gear 58 as viewed in FIG. 3, will cause shifting thereof from the front to rear as viewed in FIG. 4 thereby effecting a driving relationship between the gear 58 and the pulley 62. Reverse rotation, obviously, will cause shifting of the gear 58 in the opposite direction to thereby effect a driving relationship between the gear 58 and the pulley 54.

As can best be seen in FIG. 2, the base 36 is provided in the underside thereof, with a pair of channels 84 for containing a pair of laterally extending arms 86 and 88. The arms 86 and 88 are retained in their respective channels by means of a retaining plate 90 secured to the base 36 by suitable fasteners, for example, screws, not shown. Offset segments 92 and 94 of the arms 86 and 88 have disposed intermediate thereof a spring 96 serving to urge the arms laterally such that when sidewardly extending flanges 8 and 8' (FIG. 2) of module 34 are received in the grooves 30 and 32, ends 98 and 100 of the arms, engage walls 102 and 104 of the grooves to thereby retain the module in various positions relative to the lamp housing 28. A pair of knobs 106 and 108 attached to corresponding ends of the arms 86 and 88 provide for manipulation of the arms against the bias of the spring 96 to thereby permit varying the position of the module within the grooves.

The take-up reel 48 as best illustrated in FIGS. 5 and 6 comprises a pair of reel sections 110 and 112, each of which is preferably molded from a suitable material, for example, plastic. While each of the sections is individually fabricated as a separate one-piece construction, they are subsequently assembled in a manner to be discussed hereinafter, such that together they form an integral structure adapted to carry out the objects of the invention.

To this end, the reel section 112 is provided with a flange or end portion 114 and a hub portion 116, the latter being insertable into a blind bore or recess 118. The hub portion 116 comprises a plurality of spaced apart fingers or segments 120 which are attached at one end thereof to the flange or rim portion 116 and provided at the other end with a protrusion 122 which extends radially outward from the outer surface of the finger or segment. It will be appreciated that such a construction permits inward deflection of the fingers or segments toward each other in order to reduce the diameter of the hub portion adjacent the free end thereof. The aforementioned deflection is employed for the purpose of installing or inserting the hub portion 116 into the recess 118. The spaces between adjacent segments 120 serve as means for attaching the leading edge of a film strip to the reel structure.

A plurality of abutments or flanges 124 extend radially inwardly from a flange or rim 126 of the reel section 110 such that they extend slightly into the open end of the recess 118. These abutments are received in axially grooves or recesses 128 formed in the outer surfaces of the fingers or segments 120. This arrangement of the abutments 128 serves two purposes, therefore, to prevent relative rotation between the reel sections 110 and 112 and to restrict the maximum spacing between the rim or flange portions 114 and 126. To fix the minimum spacing between the rims, the ends of the segments 120 abut a wall 130.

A pair of telescoping members 132 and 134 cooperate with the ends of the segments 120, the protrusions 122 and the flanges 124 to retain the reel sections in their relative positions as viewed in FIGS. 5 and 6, in order to accommodate 16 or 35mm. film widths. The member 132 which constitutes the female of the pair is provided with an annular projection which extends radially inward to thereby be engageable with either of a pair of annular flanges 136 or 138 of the member 134. The member 134 constitutes a tubular construction having a reduced diameter as indicated at 140 in order to form the flange 138.

While the present invention has been described with reference to the particular structure disclosed herein, it is not intended that it be limited to the specific details and this application is intended to cover such modifications or changes as may come within the purposes of the improvements or scope of the claims forming a part hereof. For example, the take-up reel 48 could be constructed so as to accommodate more than two widths of film depending upon the requirements of the system with which it is to be used. Such a construction could be produced by providing intermediate stops similar to those disclosed.

What is claimed is:

1. In a film viewing apparatus,
   means for projecting an image onto a viewing screen,
   means including a pair of reels for supporting the film carrying the image to be projected, said support means being movable relative to said projecting means for positioning of the film in various positions relative to said projecting means,
   one of said reels being adapted to accommodate various film widths, said one of said reels comprising a first reel section having integral flange and hub portions; a second reel section having a recess for receiving said hub portion; and stop means for holding said reel sections in at least first and second positions for accommodating different film widths,
   said support means comprising a pair of sidewardly extending flanges slidingly received in a pair of opposed grooves of said viewing apparatus, said support means further comprising a pair of opposed brake members frictionally engaged in said grooves.

2. Structure as specified in claim 1 wherein said stop means comprises, a pair of telescoping members, at least one of which has a radially inwardly projecting abutment.

3. Structure as specified in claim 2 wherein, said telescoping members are disposed internally of said hub and said recess.

4. Structure as specified in claim 3 wherein, said stop means further comprises:
   means extending radially outward from said hub portion engageable with means extending radially inward adjacent the opening of said recess.

5. Structure as specified in claim 4 wherein, the free end of said hub portion is flexible for permitting insertion of said hub portion into said recess.

6. Structure as specified in claim 5 including, means for preventing relative rotation of said reel sections.

7. Structure as specified in claim 6 wherein, said means for preventing relative rotation comprises a plurality of axial recesses in one of said reel sections for receiving means extending radially from the other of said reel sections.

8. Structure as specified in claim 5 wherein, said hub structure comprises a plurality of spaced apart segments, the spacing between which provides for attachment of the leading end of a film thereto.

9. Film reel structure, said structure comprising:
    a first reel section having integral flange and hub portions;
    a second reel section having a recess for receiving said hub portion;
    a pair of telescoping members at least one of which is provided with abutment means extending radially inward thereof, said hub portion being concentric with said telescoping members and said telescoping members being disposed internally of said hub portion.

10. Structure as specified in claim 9, further comprising means extending radially outward from said hub portion engageable with means extending radially inward adjacent the entrance to said recess.

11. Structure as specified in claim 10 wherein, said hub portion is flexible at least adjacent the free end thereof for permitting insertion of said hub portion into said recess.

12. Structure as specified in claim 11, further comprising means for preventing relative rotation of said reel sections.

13. Structure as specified in claim 12 wherein, said means for preventing relative rotation comprises a plurality of axial recesses in one of said reel sections for receiving means extending radially from the other said reel sections.

14. Structure as specified in claim 11 wherein, said hub structure comprises a plurality of spaced apart finger segments substantially perpendicular to said flange portion, the spacing between which provides means for attaching the leading edge of a film strip.

* * * * *